United States Patent [19]

Maiorano

[11] Patent Number: 4,564,286

[45] Date of Patent: Jan. 14, 1986

[54] ILLUMINATION DEVICE

[75] Inventor: Dominick J. Maiorano, Webster, N.Y.

[73] Assignee: Xerox Corporation, Stamford, Conn.

[21] Appl. No.: 502,783

[22] Filed: Jun. 9, 1983

[51] Int. Cl.[4] ............... G03G 15/00; G03B 27/00
[52] U.S. Cl. .................................. 355/11; 355/1; 355/3 R; 355/7; 350/170; 350/173; 250/227
[58] Field of Search ............... 355/1, 11, 3 ER, 7, 355/14 CH, 45, 37, 44, 66; 362/26, 27, 31, 32; 350/96.1, 96.28, 170, 173, 286; 250/227

[56] References Cited

U.S. PATENT DOCUMENTS

| | | | |
|---|---|---|---|
| 2,297,851 | 10/1942 | Wyss, Jr. ................ | 350/96.1 X |
| 2,480,178 | 8/1949 | Zinberg ................. | 350/96.1 X |
| 2,561,885 | 7/1951 | Prideaux et al. ......... | 362/26 X |
| 2,761,056 | 8/1956 | Lazo .................... | 362/26 |
| 2,770,712 | 11/1956 | Dros ..................... | 362/26 |
| 2,945,958 | 7/1960 | Morris ................... | 350/96.1 X |
| 3,588,492 | 6/1971 | Pollock .................. | 350/96.1 X |
| 3,761,704 | 9/1973 | Takeichi et al. .......... | 362/27 |
| 3,840,701 | 10/1974 | Tomii et al. ............. | 355/1 X |
| 3,912,387 | 10/1975 | Brooke ................... | 355/3 R |
| 3,955,888 | 5/1976 | Kakiuchi et al. ......... | 355/1 |
| 3,981,575 | 9/1976 | Tanaka et al. ........... | 355/1 |
| 4,068,121 | 1/1978 | Bringhurst et al. ....... | 250/227 |
| 4,336,993 | 6/1982 | Banton .................. | 350/96.1 X |
| 4,441,783 | 4/1984 | Houghton et al. ........ | 350/96.1 |

FOREIGN PATENT DOCUMENTS 2011647  7/1979  United Kingdom ............... 355/7

OTHER PUBLICATIONS

Maiorano, Dominick J., "Illuminator For Interdocument and Reduction Erase", Xerox Disclosure Journal, vol. 7, No. 2, Mar./Apr. 1982, pp. 107–108.

*Primary Examiner*—William M. Shoop, Jr.
*Assistant Examiner*—Shik Luen Paul
*Attorney, Agent, or Firm*—Joseph R. Sakmyster

[57] ABSTRACT

A transparent, generally wedge-shaped linear illuminator is used to provide a uniform level of illumination suitable for performing various functions in a reproduction device. One function is to provide uniform illumunination of a charged surface so as to selectively erase charge on said surface. Another is to illuminate a document in an illumination plane. In a specific embodiment, the illuminator consists of a glass or plastic body having a first sector formed with parallel sides and a second sector having a wedge-shaped configuration. Light is introduced into the first sector and is coupled along the length of the second sector by internal reflection. As the distance between the slope and base surfaces of the wedge sector decreases in the direction of the wedge end, the angles of incidence of the incident light decrease proportionately. As the angles made by internally reflecting light drop below the critical angle of the illuminator, the light begins to exit the body at the base surface providing a uniform band of illumination along the linear length of the wedge sector. Depending upon the output power of the illumination source, the light may be used for charge erase or document illumination purposes. In one variation, reflective segments surround the inclined wedge portions of the illuminator to redirect the light back into the member thereby improving efficiency.

12 Claims, 12 Drawing Figures

ILLUMINATION DEVICE

BACKGROUND AND PRIOR ART STATEMENT

This invention relates to electrophotographic reproduction of original documents and more particularly, to an illuminator which provides a uniform radiation output level and which is especially adapted to erase unwanted charge from a photoconductor following document exposure.

In a typical electrophotographic reproduction apparatus an original document is placed on a transparent supporting platen and scanned by an illumination source, causing an image of the document to be projected upon a previously charged, photoconductive surface. A latent electrostatic image is formed on the photoconductor by the selective discharge of areas corresponding to the projected image light pattern. The latent image is then developed, fused and transferred to an output sheet using conventional xerographic techniques. It should be understood that each latent image is exposed and developed within a "frame" corresponding to the dimensions of the original document, or to reduced or enlarged dimensions in a magnification mode of operation. The areas of the photoconductor abutting this framed area are those areas between successive frames (interdocument) and edge areas bordering the frame. These interframe and edge border areas are not exposed to light reflected from the original document and hence retain the charge originally placed on the photoconductor. This charge, if permitted to remain, would be developed in a subsequent development step and may adversely affect the quality of the output copy. In addition, additional toner used in this unwanted development necessitates more frequent toner replenishment.

Various prior art techniques are known to remove the unwanted charge area. These include electrical grounding and reverse charging of the photoconductor as well as redirection of a portion of the illumination from the document illumination source towards the desired areas on the photoconductor (illumination erase). Another known technique is to dedicate an erase lamp for the specific function of illuminating and thus discharging the edge and interframe areas of the photoconductor, such as disclosed in U.S. Pat. No. 3,912,387 and Xerox Disclosure Journal Vol. 7, No. 2, March/April 1982, pp. 107-108. These prior art devices are relatively costly solutions to the erase problem in terms of power requirements and material costs. The output uniformity of the lamp may also prove inadequate for various applications.

It is therefore desirable to provide a low power, low cost illumination charge erase device with improved uniformity characteristics to provide an erase function. According to one aspect of the present invention, a novel inexpensive linear illuminator is so configured as to reduce the illumination source power requirements and improve illumination uniformity at the photo-conductive surface to be erased. This design configuration includes an illuminator assembly comprising a generally wedge-shaped transparent light pipe member having an illumination source disposed so as to couple light into the light pipe member in a direction proceeding towards the narrowing dimensions of the member. The coupled light proceeds along the length of the illuminator via internal reflection from the illuminator surfaces. As the angle made by the internally reflected light projecting the length of the member drops below some critical angle related to the wedge cycle, the light begins to exit from the surface base of the wedge providing a uniform level of illumination emanating from the entire length of the wedge. This uniform escaping illumination provides an exemplary source of energy for a variety of charge erase purposes as will be seen below. An illuminator constructed according to the above principles can also serve as an illumination source for sequentially illuminating portions of a document to be reproduced. For this purpose, higher illumination levels and therefore greater, lamp outputs are required. Both the erase and document illumination functions are discussed below with greater emphasis given to the description of the erase function. More particularly the invention is directed to a linear illumination assembly comprising:

a linear, unitary transparent, member at least one sector of which has a generally wedge-shaped configuration, and, an illumination source adapted to couple light into said sector.

In one embodiment, the assembly includes a transparent member having a wedge configuration with an illumination source positioned within an aperture in the non-wedge end.

DRAWINGS

DESCRIPTION

Figure 1:
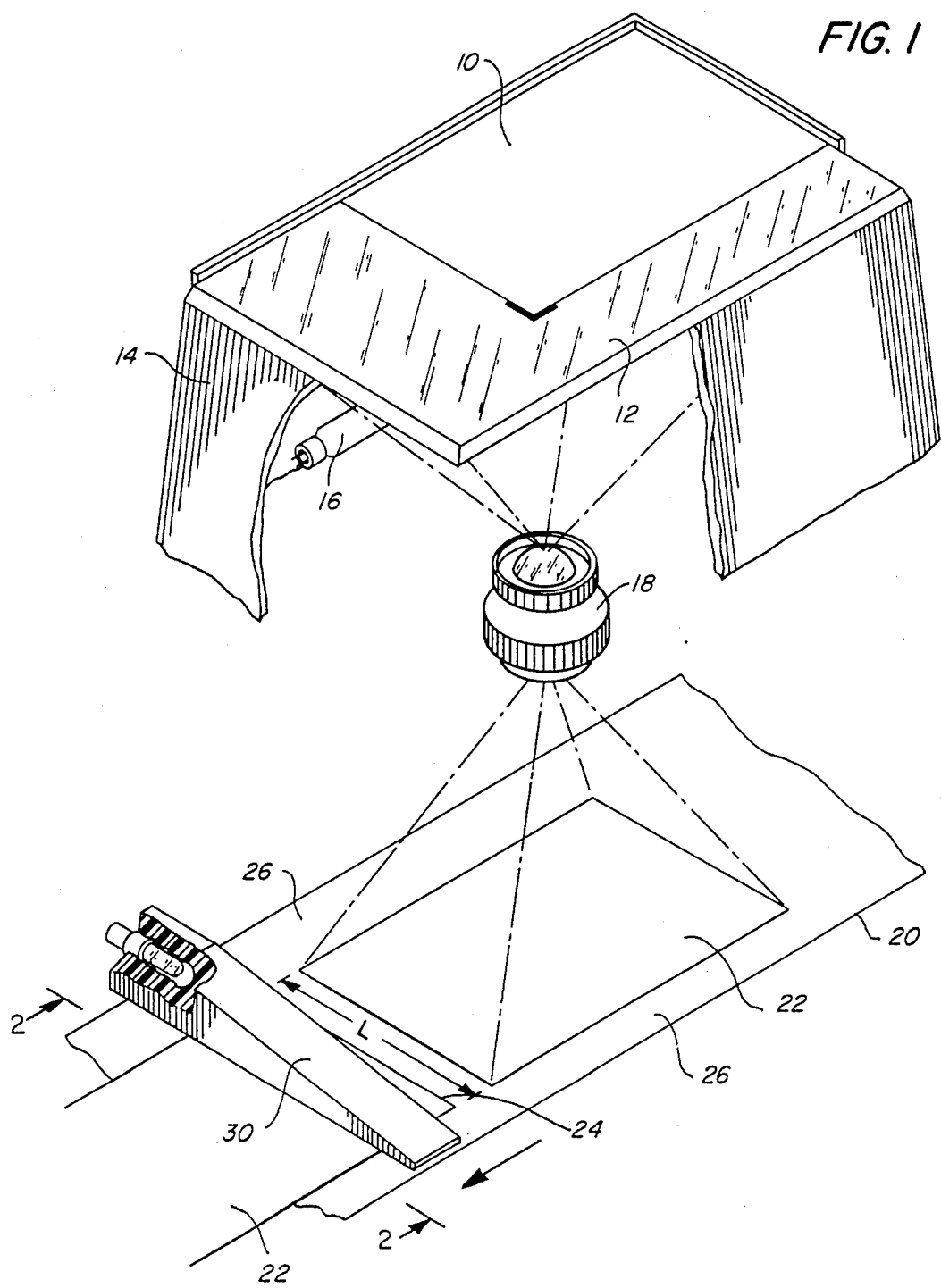
FIG. 1 shows a flash illumination imaging system utilizing a first embodiment of an image erase illuminator constructed according to the principles of the present invention.

FIG. 1 shows a flash illumination imaging system which utilizes a first embodiment of an erase illuminator constructed according to the principles of the present invention. As shown in FIG. 1, a document 10 to be reproduced is placed on a transparent platen 12 which forms the top surface of light housing 14 (only the upper half of which is shown). A flash lamp 16 within the housing is periodically energized to provide a uniform level of illumination at the bottom surface of the platen thereby causing a reflected image of the document to be projected through a lens 18 onto the surface of a photoreceptor belt 20 moving in the indicated direction. The document exposure image (shown at 1× magnification) is contained within frame 22; successive frames are separated by interframe area 24. The edge portions of the frame out to the photoreceptor edge are designated the edge areas 26. It is these areas 24, 26 which may contain unwanted residual charge areas. This unwanted charge is removed by means of linear illuminator 30 which is positioned above the photoreceptor at some point downstream from the exposure zone. This illuminator, described in further detail below, is selectively energized so as to illuminate and, hence, erase, for example an interframe area 24 shown as having a length L. The illuminator can be adapted to also erase the edge areas separately or simultaneously, as will be shown below.

Figure 2:
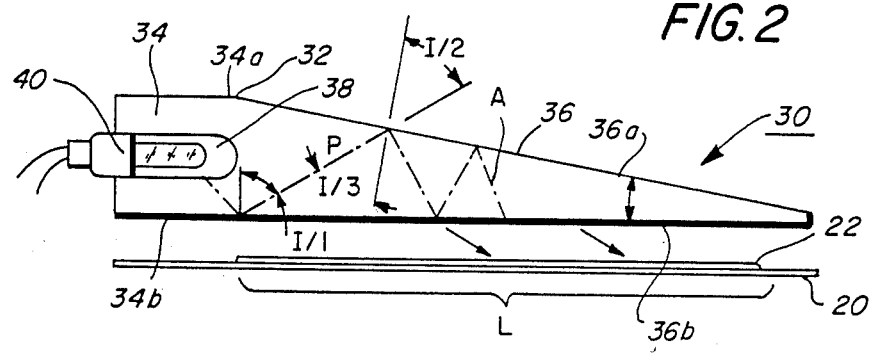
FIG. 2 is a detailed side view of the edge erase illuminator of FIG. 1.

As shown in FIG. 2, illuminator 30 comprises a partially wedge-shaped light pipe member 32 having a first lamp containment sector 34 with parallel top and bottom surfaces 34a, 34b and a second sector 36 where the top surface 36a is inclined at some angle α with respect to the base surface 36b. Positioned in an aperture 38 within sector 34 is a low voltage lamp 40 (see also FIG. 1) powered by a source not shown. The light pipe member 32 is a solid, optically transparent, body fabricated from glass, plastic, acrylic or other suitable light transmitting material.

Illuminator 30 is positioned so that sector 34 lies outside the area to be erased and sector 36 has a length approximately equal to L.

The principle of operation of illuminator 30 is as follows. Referring to FIGS. 1 and 2, lamp 40 is energized at a time coincident with arrival of the leading edge of interdocument area 24 at the upstream vertical face of member 32. Light is then coupled into sectors 34 and 36 of member 32. For purposes of description, a single light ray P is shown emanating from the lamp. Since lamp 40 is contained within aperture 38, the illumination from the lamp originates in a medium outside member 32, typically air, and then proceeds into the denser medium comprising the body of member 32. The path of the light rays upon entering member 32 is governed by the general principles of total internal reflection which states that total internal reflection occurs when the angle of incidence of light rays proceeding from a less dense to a more dense medium is equal to or greater than a critical angle. The critical angle $I_c$ is given by the expression $I_c = \arcsin n'/n$ where n is the index of refraction of the denser medium (member 32) and n' is the index of refraction of the less dense medium, (e.g. air). Applying this general principle, Applicant discovered that, in an optical transmitting material having a generally wedge configuration, light traveling in the general direction of diminishing width will, with each successive reflection from the sloping surface, undergo a reduction in the angle of incidence equal to the wedge angle. It then follows that, if the angle of incidence of the light entering the denser medium is reduced to a value less than $I_c$, then part of the incident energy will exit the dense medium and this exit will take place in a uniform manner along the surface of the non-inclining surface of the wedge; e.g. the base surface.

To illustrate this principle, it is assumed that member 32 is formed of an acrylic having an index of refraction n' of 1.491. The index of refraction of air is 1.00. The critical angle $I_c$ is therefore 42°. Sector 36 has an inclination, α, of 15°. Tracing the path of a single light ray P from lamp 40, the ray enters sector 34 and strikes surface 34b at an angle of incidence $I_1$ of about 65° within that sector. Since this angle is greater than the critical angle of 42°, the rays are totally internally reflected. The ray is then reflected into sector 36 and strikes surface 36a at an angle $I_2$ which is equal to $I_1 - 15°$ (wedge angle) or 50°. Since this angle still exceeds the critical angle of 42°, the ray is totally internally reflected from surface 36a and strikes surface 36b at a third incidence angle $I_3$. Angle $I_3$ is equal to angle $I_2 - 15°$ or 35°. Since this angle is less than the critical angle, much of the incident energy exits sector 36 and is available as erase energy at belt 20. The actual light incident along the entire length of surface 36b is formed of several orders of reflection from the light emanating from lamp 40 which combine to form a uniform level of illumination exiting along the surface.

Figure 3:
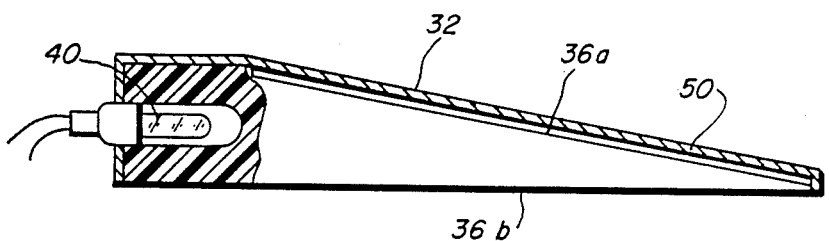
FIG. 3 is a variation of the FIG. 2 illuminator.
Figure 4:
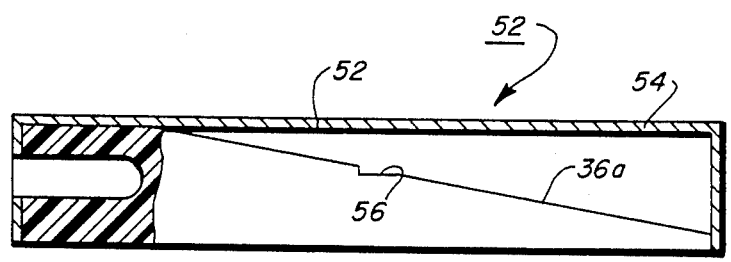
FIG. 4 is a still further variation of the FIG. 2 illuminator.

While member 32 is shown, in FIG. 2, as a solid member with a transparent outer surface, in a practical system, the efficiency and uniformity are improved by the addition of reflective material proximate illuminator surfaces 34a, 36b. Thus, to reduce the loss of any light through surfaces 34a, 34b, 36a, 36b a specularly reflective coating 50, as shown in FIG. 3 could be placed proximate to, but not in intimate contact with surfaces 34a, 36a. (Intimate contact would adversely affect the total internal reflectance characteristics of the illuminator.) In addition, the end portion of the wedge could also be treated with the same reflective material to ensure that all the light produced by lamp 40 would exit only from bottom surface 36b, and in a uniform manner. Another variation is shown in FIG. 4 where member 32 is enclosed within a rectangular cover 52 having reflective interior surfaces 54. For this embodiment any light escaping surfaces 34a, 36a reenters these surfaces at various angles along the surface, again enhancing exit uniformity at surface 34b, 36b. As also shown in FIG. 4, a trim notch 56 may be added, if desired, at some point along surface 36a to further improve uniformity.

To summarize the above description, a first embodiment of a charge erase illuminator has been shown to consist of a partially parallel, partially wedge-shaped, optically transparent light pipe. Efficiency is improved by placing a reflective material proximate to specified surface. A light source, which can be of relatively low power, is disposed so as to introduce light into the parallel end. The light proceeds along the internal surfaces of the member at progressively smaller angles of incidence along the surfaces coincident with the wedge angle. The light progressively exits along the selected surface in a uniform manner coincident with the uniform slope presented to light incident at the upper surface.

Figure 5:
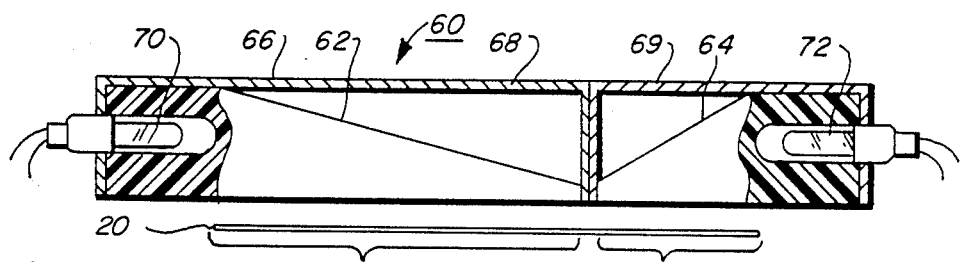
FIG. 5 is a first hybrid embodiment of an edge erase illuminator assembly combining two illuminators positioned end to end.

For purposes of description, the illuminator was described above functioning only as an interdocument area erase mechanism. The illuminator, however, can be modified to perform other erase functions as well. For example, a combination interdocument and edge erase illuminator as shown in FIG. 5. Here, illuminator 60 consists of two linear illuminators 62, 64 placed within rectangular housing 68, 69 respectively in a manner such that the wedge portions are abutting. Each housing has reflective entrance surfaces for the purposes previously described. Each illuminator has its own associated separately addressable lamp 70, 72. Where only the interdocument gap 24 is to be illuminated (erased), lamp 70 is energized, by control means not shown, at the appropriate time, and for the appropriate time interval, to erase the interframe charge area passing beneath. Lamp 72, under control of the same control means, can be activated so as to continuously erase charge in the edge areas 26 shown in FIG. 1.

Figure 6:
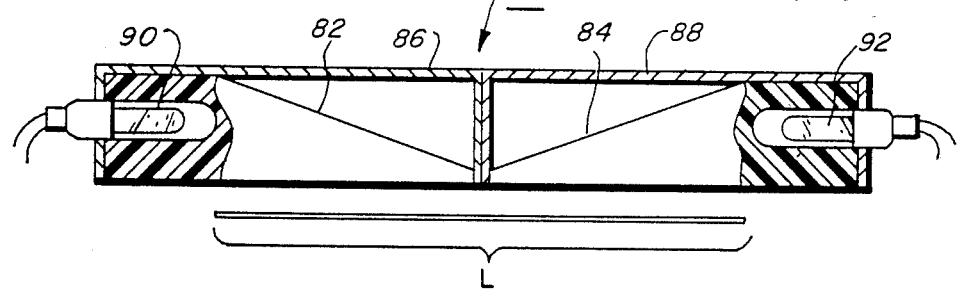
FIG. 6 is a second hybrid embodiment of an edge erase illuminator assembly combining two higher output illuminators.

FIG. 6 shows the linear illuminator of the present invention designed for yet another application. Certain reproduction systems require a charge erase mechanism positioned just upstream from the mechanism which originally charges the surface of the photoconductive imaging member. The level of illumination required for this function can be produced from 3 or 4 watt lamps. FIG. 6 shows an illuminator 80 consisting of two linear illuminators 82, 84 positioned so that the wedge ends are abutting. The illuminators may again be placed within reflective covers 86, 88. Lamps 90, 92 are higher power lamps which provide the greater energy required for the pre-charge erase function. Lamps 90, 92 would be engaged simultaneously by the appropriate control means. The combined length of the wedge-shaped portions of illuminators 82, 84 would be equal to, for example, at least dimension L shown in FIG. 1.

Figure 7:
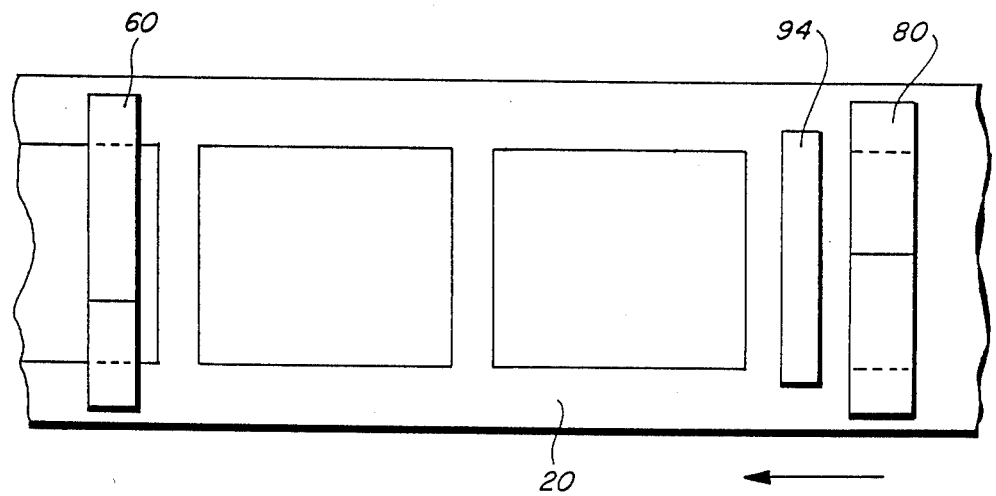
FIG. 7 is a top perspective view of an imaging plane utilizing the illuminator assembly of FIG. 6.

FIG. 7 shows a perspective view of photoreceptor belt 20 of FIG. 1 with a precharge cleaning illuminator 80 positioned upstream of a charging unit 94. Downstream from the exposure station is hybrid illuminator 60 functioning as an interdocument and edge erase device.

Figure 8:
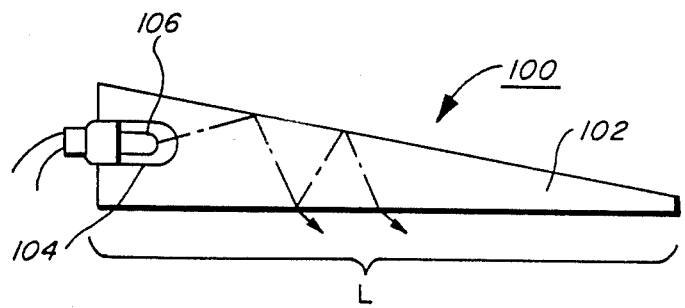
FIG. 8 is a side view of a second embodiment of the image erase illuminator.

The above description has been limited, thus far, to an illuminator having two sectors, a first sector with parallel sides and a second sector including the wedge-shaped member. As discussed above, the useful erase energy is derived from the base of the wedge-shaped member. Other embodiments are possible utilizing only a wedge member. Thus, as shown in FIG. 8, an erase illuminator 100 comprises a unitary, acrylic member 102 having an aperture 104 at one end thereof. Lamp 106 is positioned within the aperture. The wedge length, in this embodiment can then be made equal to the light L of the interdocument area. The same variations can be effected with this embodiment as described in connection with FIGS. 3 and 4 and the same hybrid embodiments can be accomplished as shown in FIGS. 5 and 6.

Figure 9:
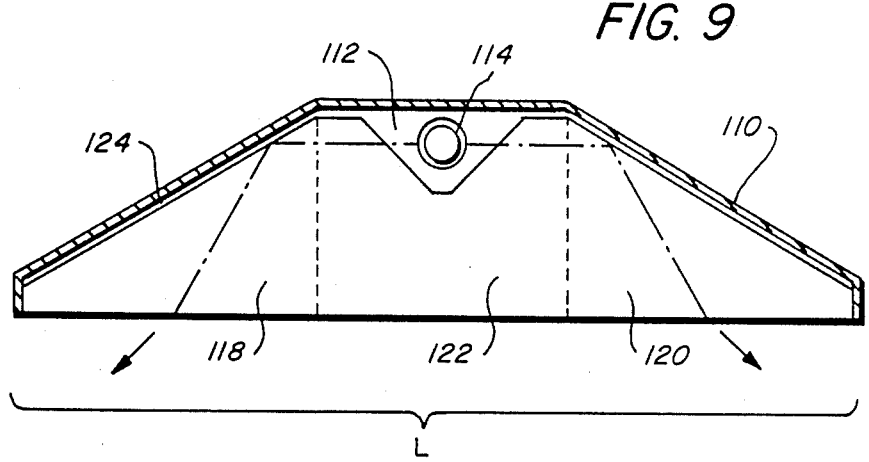
FIG. 9 is a side view of a third embodiment of the image erase illuminator of the present invention.
Figure 10:
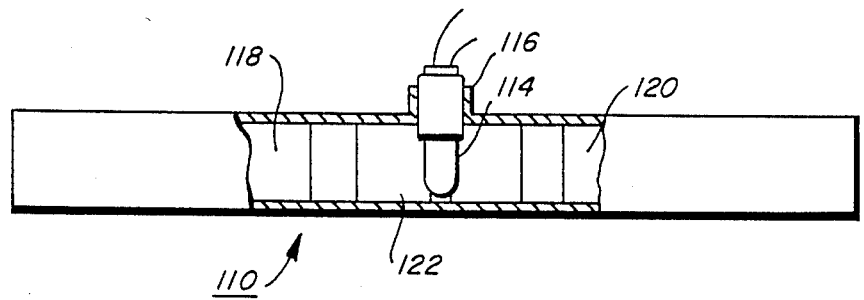
FIG. 10 is the top view of the illuminator of FIG. 9.

A still further embodiment which utilizes a single lamp is shown in FIG. 9 (side view) and FIG. 10 (top view). Referring to these figures, in a third embodiment, an integral erase illuminator 110 has a generally truncated pyramidal configuration with a notch 112 cut into the apex to accomodate a single lamp 114. The lamp can be mounted within the notch by means of a holder 116. The member 110 is thus seen to consist of a first and second wedge portion 118, 120, respectively and a central portion 122. The wedge portions provide the erase energy at the bottom surface by virtue of the total internal reflectance characteristics described above. Erase energy from the central portion is a combination of direct contribution from lamps 114 and energy reflected from the two wedge sectors. Reflector strip 124 can be attached above the top surface of illuminator 110 as shown.

Figure 11:
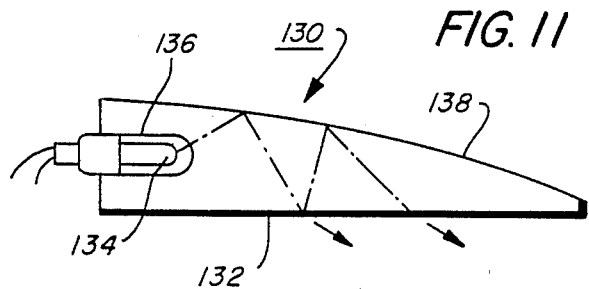
FIG. 11 is a side view of an embodiment of the illuminator wherein the sloping surface has a slightly curved configuration.

Although the above embodiments disclosed wedge-shaped members having planar sloping surfaces, other shapes for the sloping surfaces are possible consistent with the invention as long as the shape presents uniformly decreasing angles to the light incident therein. Thus, the sloping surface could also assume a curved configuration as shown in FIG. 11. Here, erase illuminator 130 comprises a unitary transparent member 132 having a lamp 134 set into aperture 136. The illuminator has a curved, sloping surface 138 but still retains the generally wedge-shaped configuration characteristic of the invention.

Figure 12:
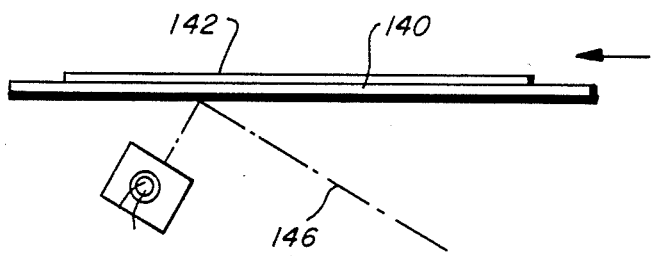
FIG. 12 is a side view of the illuminator of FIG. 8 used as a document scanning illumination source.

The above descriptions have emphasized the use of the illuminator as a charge erase mechanism. For this application, a typical illumination source would be a tungsten lamp operating from a small power level on the order of several watts. The power would be at a level sufficient to discharge a photoreceptor from a typical charge level of 500 volts to aresidual charge level. However, the illuminator of the present invention may also be adapted for other uses. For example, the illuminator, using a higher output lamp, may be used to provide illumination of a document at an object plane. As shown in FIG. 12, illuminator assembly, which may be, for example, illuminator 100, described in conjunction with FIG. 8, is positioned beneath platen 140 upon which is placed document 142. The platen is moved past illuminator 100 by means not shown. A uniform band of illumination, emanating from the base surface of the illuminator, illuminates a strip of document 142 and is reflected along optical path 146. The reflected light is then projected by conventional optical techniques onto a photoreceptor forming a flowing latent image of the scanned document.

The illuminator of the present invention may also be adapted to provide edge fadeout of unexposed margin portions of a photoconductor during a reduction mode of operation. The illuminator, for this application, would be energized coincident with the selection of the reduction mode of operation.

In conclusion, it may be seen that there has been disclosed a novel illumination device. The exemplary embodiments described herein are presently preferred, however, it is contemplated that further variations and modifications within the purview of those skilled in the art can be made herein. For example, the position of the lamps may be modified to change the original direction of the coupled light rays. The following claims are intended to cover all such variations and modifications as fall within the spirit and scope of the invention.

What is claimed is:

1. A linear illumination assembly comprising:
   a linear, solid, transparent member at least one sector of which has a wedge-shaped configuration characterized by having a top specularly reflecting surface obliquely inclined to a horizontal bottom surface, and
   an illumination source adapted to couple light into said wedge-shaped sector;
   said illumination source positioned within an aperture formed in said transparent member and in a medium having a refractive index n ' and said transparent member having a refractive index n greater than n' wherein said light proceeds by internal reflection along the obliquely inclined surface of said member, said light being totally internally reflected from said surface when forming an angle of incidence greater than a critical angle $I_c$, a portion of said light exiting the base surface of said member when forming an angle of incidence less than angle $I_c$ where $I_c = \arcsin n'/n$.

2. The illumination assembly of claim 1 wherein said lamp is positioned in a medium having a refractive index n' and said transparent member has a refractive index n greater than n' and wherein said light proceeds by internal reflection along the sloping surface of said member, said light being totally internally reflected from said surface when forming an angle of incidence greater than a critical angle $I_c$ but a portion of said light exiting the base surface of said member when forming an angle of incidence less than angle $I_c$ where $I_c = \arcsin n'/n$.

3. The illumination assembly of claim 1 wherein said member comprises a single sector with a wedge configuration with an aperture in the non-wedge end and wherein said illumination source is positioned within said aperture.

4. The illumination assembly of claim 1 wherein said member has a generally truncated pyramidal configuration with a notch removed from the apex thereof, said illumination source positioned within said notch.

5. The illumination assembly of claim 1 wherein said member has a first sector with essentially parallel sides, said first sector integrally and optically connected to a second, generally wedge-shaped sector, said illumination source positioned so as to couple light from said first sector into said second sector.

6. The illumination assembly of claim 5 further including a second transparent member abutting said first member at the wedge end, said second member having a second illumination source positioned at the opposite end.

7. The illuminator assembly of claim 1 wherein the oblique surface of said transparent member has a reflective material adjacent said surface.

8. The illuminator assembly of claim 7 wherein said transparent member is partially enclosed by a housing having internally reflecting walls whereby rays exiting said member are reflected back into the member.

9. The illumination assembly of claim 1 wherein said obliquely inclined surface is planar.

10. In an imaging system wherein a document is exposed onto a previously charged photoreceptive surface, a device for erasing unwanted residual charge following said exposure, said device comprising a linear, solid, transparent member at least one sector of which has a wedge-shaped configuration characterized by having a top specularly reflecting surface obliquely inclined to a horizontal bottom surface, an illumination source adapted to couple light into said wedge-shaped sector
said illumination source positioned within an aperture formed in said transparent member and in a medium having a refractive index n' and said transparent member having a refractive index n greater than n' wherein said light proceeds by internal reflection along the obliquely inclined surface of said member, said light being totally internally reflected from said surface when forming an angle of incidence greater than a critical angle $I_c$, portion of said light exiting the base surface of said member when forming an angle of incidence less than angle $I_c$ where $I_c = \arcsin n'/n$.

11. The imaging system of claim 9 further including a second transparent member having the same general configuration and abutting the first member to form an extended linear illuminator.

12. In an optical system for a reproduction device wherein a document lying in an optical plane is scanned and an image projected onto a photosensitive imaging plane, a scanning illumination device comprising a linear, solid transparent member at least one sector of which has a wedge-shaped configuration characterized by having a top specularly reflecting surface obliquely inclined to a horizontal bottom surface, and an allumination source adapted to couple light into said wedge-shaped sector,
said illumination source positioned within an aperture formed in said transparent member and in a medium having a refractive index n' and said transparent member having a refractive index n greater than n' wherein said light proceeds by internal reflection along the obliquely inclined surface of said member, said light being totally internally reflected from said surface when forming an angle of incidence greater than a critical angle $I_c$, a portion of said light exiting the base surface of said member when forming an angle of incidence less than angle $I_c$ where $I_c = \arcsin n'/n$.

* * * * *